United States Patent [19]
Kohno

[11] 4,289,282
[45] Sep. 15, 1981

[54] TAPE REEL

[75] Inventor: Kaname Kohno, Tokyo, Japan

[73] Assignee: Dai-Ichi Seiko Co., Ltd., Kawaguchi, Japan

[21] Appl. No.: 117,212

[22] Filed: Jan. 31, 1980

Related U.S. Application Data

[63] Continuation-in-part of Ser. No. 16,732, Mar. 1, 1979, abandoned.

[51] Int. Cl.³ .............................................. B65H 75/18
[52] U.S. Cl. .................................................. 242/71.8
[58] Field of Search ...................... 242/71.8, 115, 116, 242/118, 118.6, 118.61, 118.5, 118.8, 68.5, 68.6

[56] References Cited

U.S. PATENT DOCUMENTS

| | | | |
|---|---|---|---|
| 3,468,492 | 9/1969 | Cragg | 282/71.8 |
| 4,030,675 | 6/1977 | Eissfeldt | 242/71.8 |
| 4,176,804 | 12/1979 | Nemoto | 242/71.8 |
| 4,226,381 | 10/1980 | Katata | 242/71.8 |

Primary Examiner—Edward J. McCarthy
Attorney, Agent, or Firm—Cushman, Darby & Cushman

[57] ABSTRACT

A tape reel comprising a lower reel member having a hub, a disc-like upper reel member, protrusions formed on the end surface of said hub and holes formed in said upper reel member in such a shape as to be elongated in the circumferential direction, thin on one side and thick on the other side, whereby said reel members can be assembled with each other by fitting said protrusions into said elongated holes and fixed to each other by rotating said reel members.

4 Claims, 5 Drawing Figures

TAPE REEL

RELATED APPLICATION

This is a continuation-in-part of my parent application Ser. No. 16,732 filed Mar. 1, 1979, now abandoned.

BACKGROUND OF THE INVENTION

1. Field of the invention

The present invention relates to a tape reel and, more specifically, to a tape reel for use with a video cassette.

2. Description of the prior art

The conventional tape reel for use with a video cassette consists, as shown in FIG. 1, of a lower reel member 1 having a hub 2 and an upper reel member 3 both of which are made of a synthetic resin. Plural number of protrusions 2a are formed on the hub 2 of the lower reel member 1 and holes 3a are formed in the upper reel member 3 at the positions corresponding to the protrusions 2a respectively, so that the tape reel is composed by assembling the upper and lower reel members so as to fit the protrusions 2a on the lower reel members into the holes 3a in the upper reel members and fixing the tops of the protrusions by ultrasonic welding or the similar means.

Such a conventional tape reel has defects that it requires a manufacturing stage of welding or the like and that the reel members are deformed in the welding stage.

SUMMARY OF THE INVENTION

A general object of the present invention is to provide a tape reel comprising a lower reel member having a hub on which protrusions are formed and an upper reel members having engaging portions which are thin on one side and thick on the other side for engagement with the protrusions formed on the hub, whereby both the reel members can be clamped and fixed to each other by simply turning the upper reel member relative to the lower reel member so as to engage the protrusions with the engaging portions in composing a tape reel.

DESCRIPTION OF THE PREFERRED EMBODIMENTS

Figure 1:
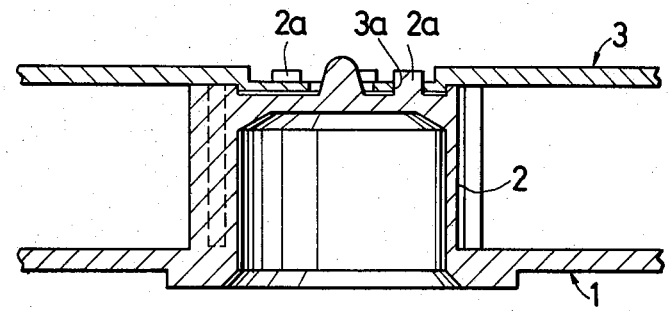
FIG. 1 shows a sectional view illustrating the construction of the conventional tape reel.
Figure 2:
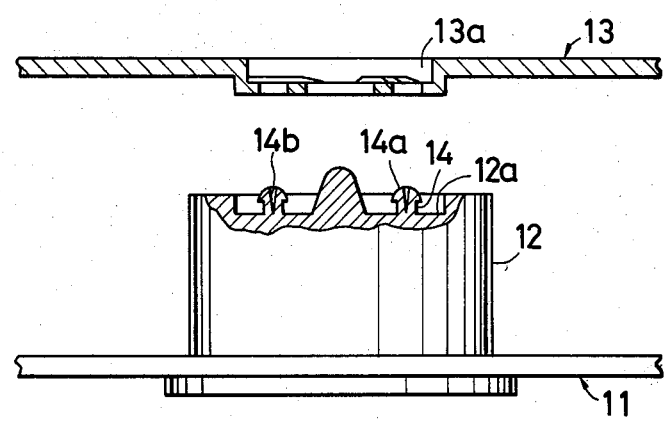
FIG. 2 shows a sectional view illustrating the construction of an embodiment of the tape reel according to the present invention.
Figure 3:
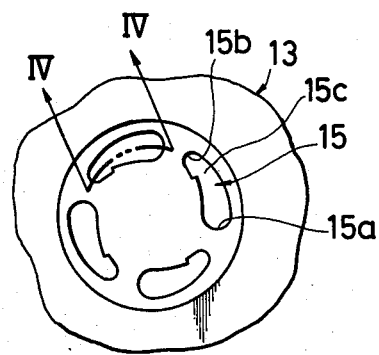
FIG. 3 shows a plane view illustrating details of the construction of the upper reel member of the Embodiment 1.
Figure 4:
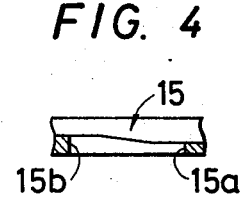
FIG. 4 illustrates a sectional view taken along IV—IV in FIG. 3.

Referring now to the accompanying drawings illustrating some preferred embodiments, the present invention will be described more detailedly below. FIG. 2 shows a sectional view illustrating an upper reel member and a lower reel member before assembly in the Embodiment 1, wherein the reference numeral 11 represents the lower reel member having a hub 12 and the reference numeral 13 designates an upper reel member. On the hub 12 of the lower reel member 11, plural number of protrusions 14 having collar-like heads 14a are formed. On the other hand, elongated holes 15 which are as wide at the portion 15a as the diameter of heads 14a of the protrusions 14, narrowest at the portion 15c and have a notch at 15b are formed in the upper reel member 13 as as shown in FIG. 3. The portion 15c of the elongated holes 15 has width slightly narrower than the diameter of the root of the protrusion 14. The edges of the holes are thin at the portion 15a and thick at the portion 15b as shown in FIG. 4. Both of these reel members are entirely made of a synthetic resin.

For assembling the reel members having such constructions, the protrusions 14 formed on the hub 12 of the lower reel member 11 are inserted into the respective elongated holes 15 of the upper reel member 13, and then the reel members are rotated relatively to each other. This rotation shifts the respective protrusions into the narrow portions 15b of the elongated holes 15 to be caught in the elongated holes. Since the protrusions shift from the thin portions to the thick portions at the same time, the upper reel member is caught between the end surfaces 12a of the hub 12 and heads 14a of the protrusions 14. The upper reel member is therefore firmly fixed with the lower reel member. The protrusion 14 is made of a synthetic resin integrally with the hub 12. Therefore, when both the reel members are assembled with each other, the protrusion 14 is strongly fitted into the narrow portion 15c of the elongated holes 15, elastically compressed and deformed in its radial direction, and then reaches the portion 15b. The protrusion deformed by the narrow portion 15c is returned elastically to its initial condition when it reaches the portion 15b. Since the width of the narrow portion 15c is slightly narrower than the diameter of the root of the protrusion 14, the protrusion cannot shift in the reverse direction in natural condition. Therefore, after both the reel members are assembled with each other, they cannot be disassembled so long as they are forcibly turned in the reverse direction. When a groove 14a' is formed in the protrusion as shown in FIG. 2, the protrusion 14 is elastically deformed to narrow the groove 14a' while it is passing through the narrow portion 15c. Then, the protrusion 14 returns to its initial condition at the portion 15b and the groove 14a' is widened. Hence, the protrusion cannot shift in the reverse direction by natural force. In order to prevent the heads 14a of the protrusions 14 from extruding from the outside surface of the upper reel member when both the reel members are assembled, a cavity 13a can be formed in the upper reel member 13 as shown in FIG. 2.

Figure 5:
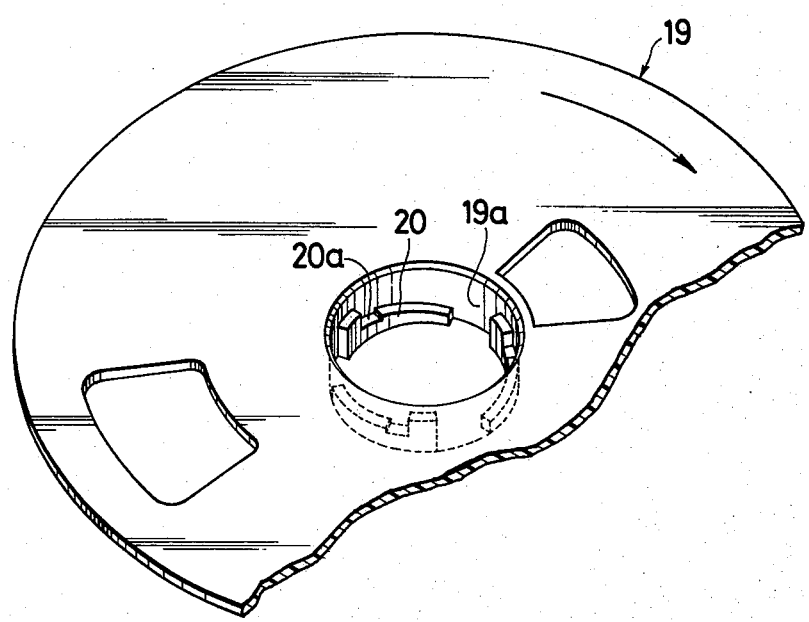
FIG. 5 illustrates an oblique perspective view showing the construction of another embodiment of the present invention.
Figure 5:
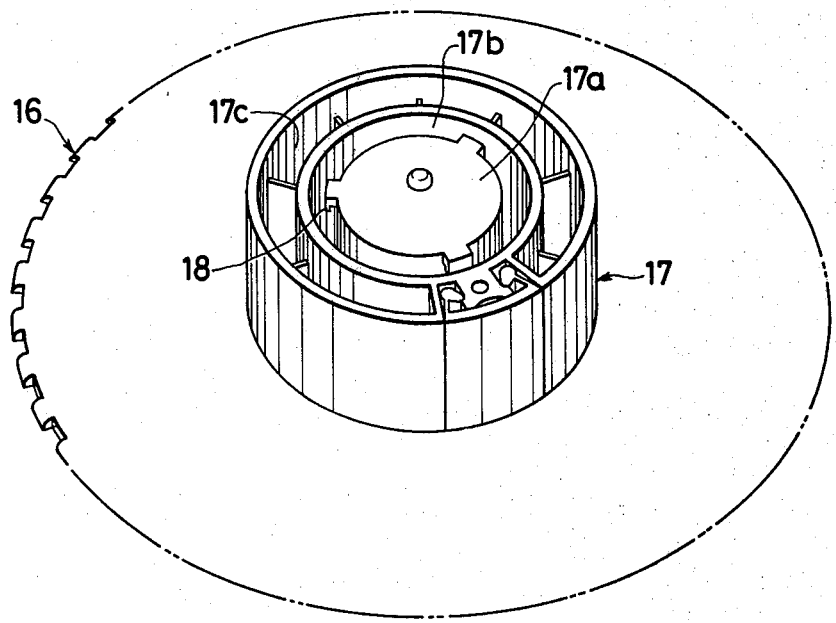

FIG. 5 illustrates another embodiment of the present invention wherein the reference numeral 16 represents a lower reel member having a hub 17 in which two circular grooves 17b and 17c are formed. The reference numeral 18 designates claw-like protrusions formed on the side of the cylindrical portion 17a located inside the groove 17b of the hub 17. The reference numeral 19 denotes an upper reel member having a ring-like protrusion 19a. This protrusion 19a is formed at such a position that it is to be inserted into the groove 17b formed in the hub 17 of the lower reel member 16 when both the reel member are assembled with each other. The reference numeral 20 is a step portion which is thin on one side and thick on the other side just like the elongated holes shown in FIG. 4. A slightly notch (slight concavity) 20a is formed in this step portion 20.

For composing a tape reel by assembling the upper and lower reel members with each other in the Embodiment 2, the ring-like protrusion 19a of the upper reel member is fitted into the groove 17b in the hub 17 of the lower reel member 16, and then the upper reel member 19 is rotated relative to the lower reel member 16 in the direction indicated by an arrow in the figure so as to fix both the reel members to each other. Since the protrusions 18 formed on the side of the cylindrical portion 17a of the hub 17 shifts during the rotation from the thin portion to the thick portion of the step portion 20 formed in the ring-like protrusion 19a of the upper reel member, the step portions 20 are brought into close contact with the protrusions 18 to push them up, whereby the upper reel member 16 and the lower reel member 19 are clamped and fixed to each other. Since the protrusion 18 is made of a synthetic resin integrally with the cylindrical portion 17a in this case, the protrusion 18 is elastically deformed as it shifts to the thick portion of the step portion 20. When the protrusion 18 reaches the notch 20a of the step portion 20, the protrusion 18 elastically returns to its initial condition and fixed within the notch 20a. Therefore, both the reel members cannot be disassembled unless they are turned forcibly in the reverse direction.

As is clearly understood from the foregoing descriptions, the present invention makes it possible to assemble and fix both the reel members by simple procedures of assembling and rotating the upper and lower reel members with each other. Therefore the present invention permits manufacturing tape reels without requiring welding stages or fear of deformation of the reel members.

I claim:

1. A tape reel comprising a lower reel member comprising a disc-like portion and a hub which are designed as an integral part, a disc-like upper reel member, protrusions formed in said hub, and engaging portions which are formed in said upper reel member in such a shape as to be thin on one side and thick on the other side as measured in the direction perpendicular to the surface of said disc-like upper reel member, a notch being formed on the thick side of said engaging portions, whereby said upper and lower reel members can be fixed firmly to each other under attracting force produced by engagement between said protrusions and said engaging portions when said upper reel member is assembled with said lower reel member, and said upper reel member is rotated so as to engage said protrusion with the notch of said engaging portions.

2. A tape reel comprising a lower reel member comprising of a disc-like portion and a hub which are designed as an integral part, a disc-like upper reel member, protrusions formed on the end surface of said hub, engaging holes which are formed in the circumferential direction in said upper reel member in such a shape as to have thin fringes on one side and thick fringes on the other side as measured in the direction perpendicular to the surface of said upper reel member, and a notch being formed on said thick side of said engaging hole, whereby said upper and lower reel members can be fixed firmly to each other under attracting force produced by engagement between said protrusions and said engaging holes when said protrusions are inserted into the portions of said engaging holes having the thin fringes and said upper reel member is rotated relative to said lower reel member until said protrusions are shifted to the portions of said engaging holes having the thick fringes and engaged with said notch.

3. A tape reel comprising a lower reel member comprising of a disc-like portion and a hub having an integral structure forming at least one groove which are designed as an integral part, and upper reel member having a ring-like protrusion, protrusions formed at least on one side of said structure forming said groove, step portions which are formed on one side of said ring-like protrusion in such a shape as to be thin on one side and thick on the other side as measured in the direction perpendicular to the disc-like portion of said upper reel member, and a notch being formed in said step portion, whereby both the upper and lower reel members can be fixed firmly to each other under attracting force produced by engagement between said protrusions and said step portions when the ring-like protrusion of said upper reel member is inserted into the ring-like groove in the hub of said lower reel member and then rotated until said protrusions are engaged with the notch of said step portions.

4. A tape reel according to claim 3 wherein said protrusions are formed on the side of the cylindrical portion formed inside the circular groove which is formed on the innermost side.

* * * * *